United States Patent [19]
Hauber

[11] 3,925,607
[45] Dec. 9, 1975

[54] ROTARY DATA BASE CONVERTER WITH FLEXIBLE DATA BASE

[75] Inventor: Charles Elwood Hauber, San Jose, Calif.

[73] Assignee: The Singer Company, New York, N.Y.

[22] Filed: Aug. 21, 1974

[21] Appl. No.: 499,200

[52] U.S. Cl. ........... 178/7.1; 178/7.6; 178/DIG. 27; 178/DIG. 28; 346/138
[51] Int. Cl.² ............................................ H04N 1/08
[58] Field of Search ............... 178/7.6, 7.1, DIG. 27, 178/DIG. 28, 6.6 R; 346/138

[56] References Cited

UNITED STATES PATENTS

| | | | |
|---|---|---|---|
| 2,469,423 | 5/1949 | Wise | 178/DIG. 27 |
| 3,296,622 | 1/1967 | Ridings | 178/6.6 R |
| 3,386,362 | 6/1968 | Soenksen | 346/138 |
| 3,560,641 | 2/1971 | Taylor | 178/6.6 R |
| 3,651,256 | 3/1972 | Sherman | 178/7.6 |

*Primary Examiner*—Howard, W. Britton
*Attorney, Agent, or Firm*—Paul Hentzel; James C. Kesterson

[57] ABSTRACT

A rotating assembly retains a data film in a cylindrical configuration, and is scanned by a traversely moving scanner. The scanners operate in the light transmission mode with parallel moving light source and light sensitive heads, one of which is inside the data film cylinder. The film is mounted over a large scan window on the rotating assembly. The portion of the film in the center region of the window deviates from the cylindrical configuration due to unsymmetrical bending moments created by wrapping the normally planar film into a cylindrical shape. Structure internal to the data film cylinder, such as a transparent support sheet, movable hoops, or air bearing devices provide outward radial forces for maintaining a circular cross section along the data film cylinder.

10 Claims, 13 Drawing Figures

ROTARY DATA BASE CONVERTER WITH FLEXIBLE DATA BASE

FIELD OF THE INVENTION

This invention relates to rotary data convertors, and more particularly to rotary data convertors with thin, flexible data mediums which are maintained in a cylindrical form by internal radial forces.

DESCRIPTION OF THE PRIOR ART contact

Heretofore, rotary data conversion using peripherally supported flexible data plates, involved large deviations of the plate position. The unsupported center regions of the plate were too far from the edges of the scanning window to receive adequate support.

It is, therefore, an object of this invention to provide a rotary data convertor for large area flexible data plates without excessive deviation.

BRIEF DESCRIPTION OF THE DRAWING

Further objects and advantages of the rotary data convertor and the operation of the radial force device will become apparent from the following detailed description taken in conjunction with the drawings in which:

FIG. 1 shows a data convertor system 10 with a rotating assembly 12 for supporting a data medium 14. The data on medium 14 is read by scanner 16 as assembly 12 is turned on a shaft 17 by a drum drive 18.

Figure 1:
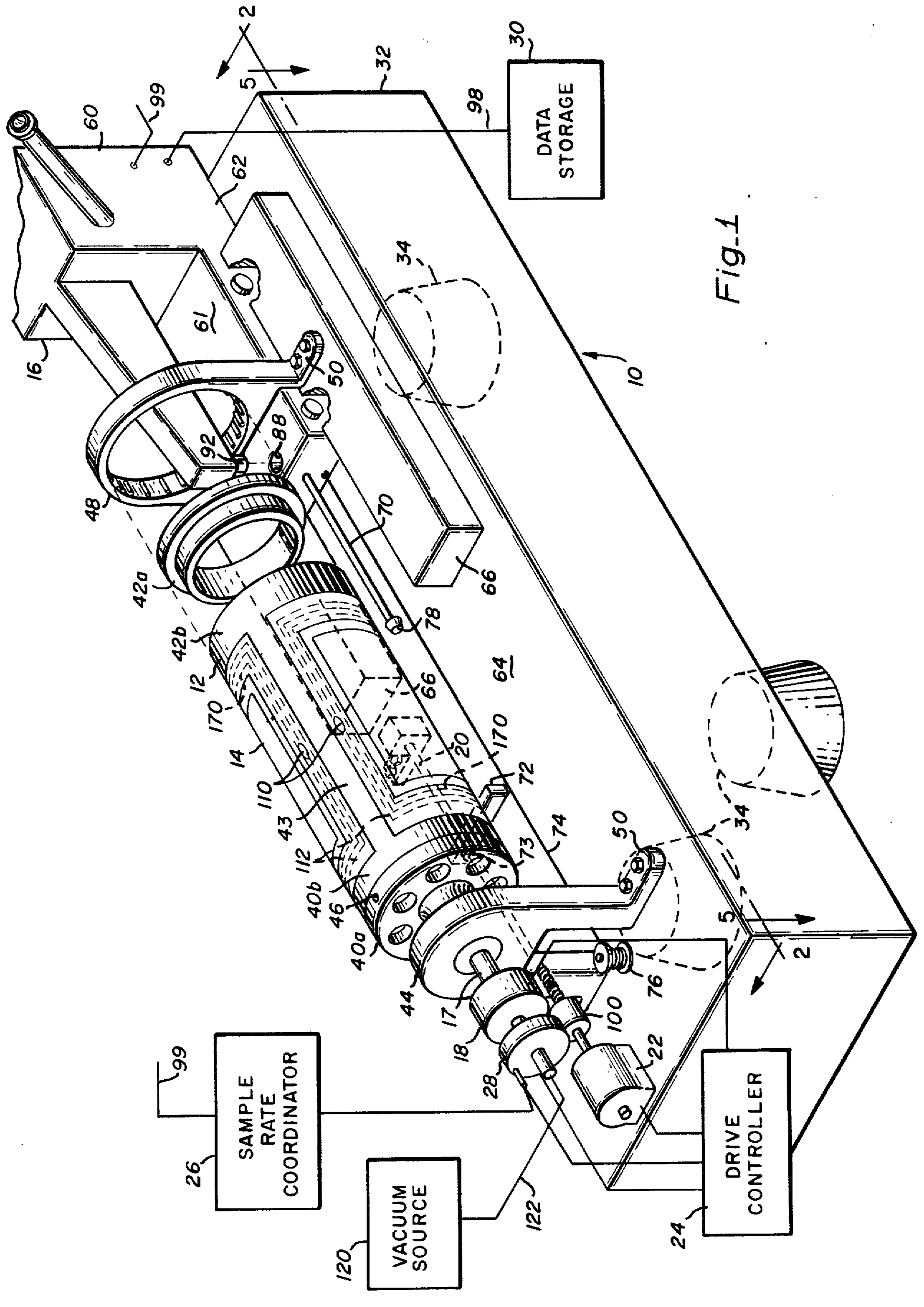
FIG. 1 is an exploded isometric view showing the rotating assembly which retains the data film in a cylindrical configuration.

Scanner 16 advances axially along a lead screw 20 incrementally turned by a stepping motor 22. A drive controller 24 coordinates the radial and axial motion between medium 14 and scanner 16; and sample rate coordinator device 26 periodically activates scanner 16 in response to an encoder 28 which is mounted on the axis of rotating assembly 12 for monitoring the rotation thereof. The existing data base on medium 14 is read and processed in digital form as a new data base into a storage device 30. The entire convertor system 10 is mounted on a suitable foundation such as marble slab 32 which is preferably vibration isolated by a servo controlled three point suspension air cushion 34.

Rotating assembly 12 of the FIG. 1 embodiment maintains data film 14 in the shape of a cylinder 36 inches long and 15.5 inches in diameter. Larger assemblies may be provided for larger data plates. Assembly 12 has two end discs 40 and 42 connected by a spine 43. End disc 40 supports the front end of rotating assembly 12 and rests on a suitable support structure such as duplex front bearing 44 which radially bears the assembly weight, but prevents axial movement. The rear of assembly 12 is supported by end disc 42 which rests on a wide bore rear bearing 48 (shown in the exploded portion of FIG. 1). Rear bearing 48 is preferably a radial type which allows axial movement of disc 42 for accommodating thermal expansion of spine 43. The spine, end discs, and bearings are supported above slab 32 by front and rear legs 50, providing room thereunder for the lower arm of scanner 16.

Scanner 16 is mounted on an electronics carriage 60. Carriage base 61 is vertically supported and laterally aligned by an air slide bearing 62. The vertical portion of air bearing 62 is maintained by large diameter swivel mounted air pads threaded into the bottom surface of base 61. The lateral guide blocks 66 cooperate with air pads mounted on the side of carrier base 61 to maintain the lateral alignment. Carriage 60 advances along lead screw 20 as stepping motor 22 is activated by controller 24. A pusher rod 70 extends from carriage 60 and contacts a nut or rider flange 72 which moves on lead screw 20. The rider-push rod contactt is maintained as rider flange 72 moves along lead screw 20 by a suitable spring device such as constant torque spool 76 which is connected to carriage 60 by a cable 74. A shock absorber 78 positioned between push rod 70 and rider flange 72 dampens longitudinal vibrations from lead screw 20.

Figure 2:
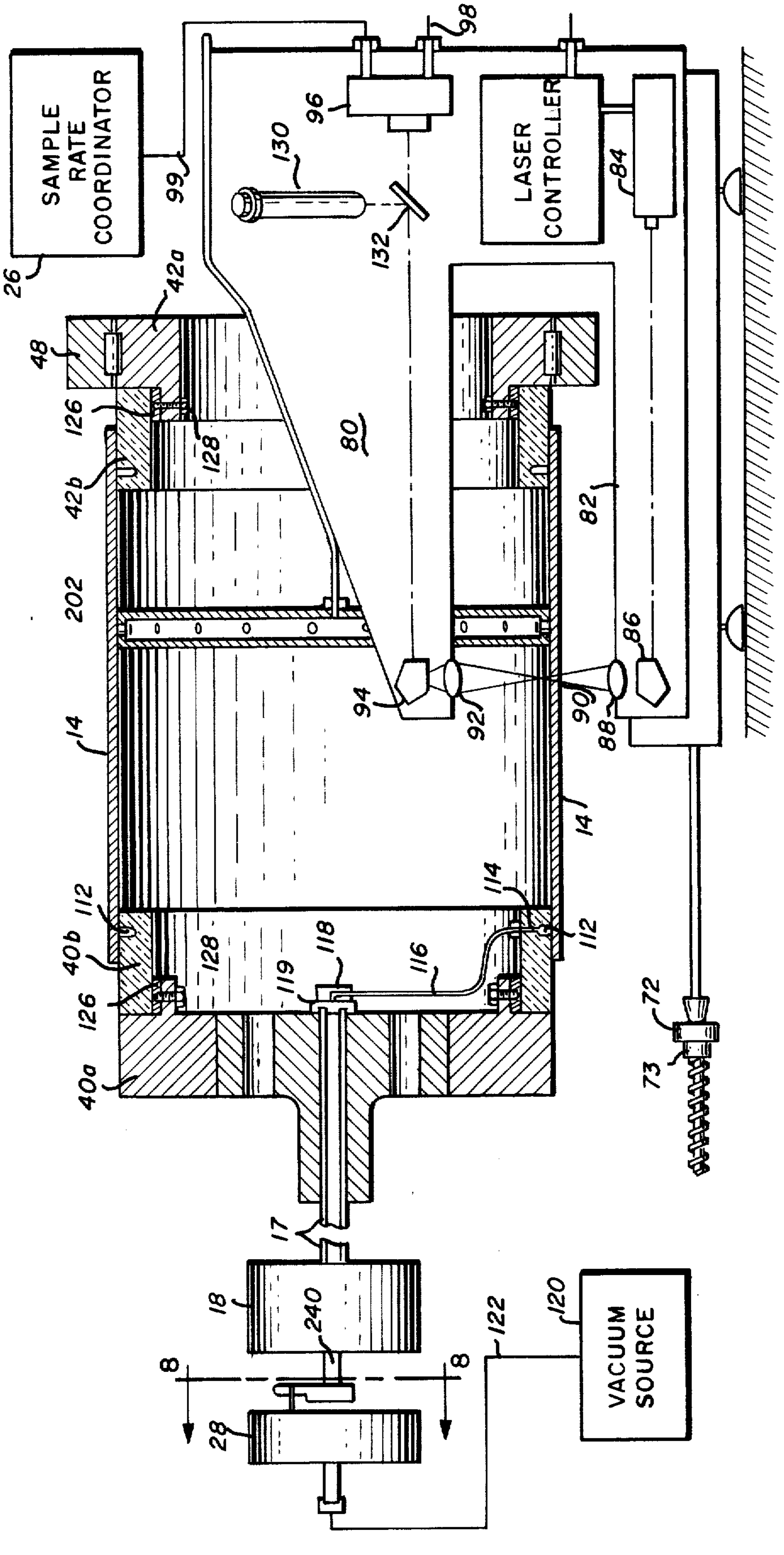
FIG. 2 is a sectional side view of an air bearing embodiment showing an air bearing plunger mounted on the scanning assembly.

FIG. 2 shows an upper arm 80 of carriage 60 extending into rotating assembly 12 through large bore bearing 48, and a lower arm 82 extending under drum 60. Lower arm 82 carries a suitable light source such as laser 84 providing a horizontal laser beam incident onto a penta-prism 86 which refracts the beam upwards into a lens 88. Lens 88 focuses the laser beam onto data medium 14 forming an illuminated scanning spot 90 having a diameter consistent with the resolution of converter 10. Light spot 90 moves axially on data medium 14 as carriage 60 advances. The rotation of assembly 12 simultaneously with this slow axial movement causes spot 90 to scan the entire surface of the data area on medium 14. For each scanning rotation of assembly 12, stepping motor 22 turns a minimum of one step, causing lead screw 20 to axially advance and traverse carriage 60 a small increment which defines the traverse resolution of converter 10. If desired, one or several rotations of assembly 12 may elapse between scanning rotations to permit carriage 60 to advance and stabilize. The diameter of light spot 90 is preferably equal to the traverse step of carriage 60, and the rotational distance between samples. Alternatively, torque motor 18 could simultaneously drive both rotating assembly 12 and traverse moving scanner 16 resulting in a helical scan pattern of very low pitch.

The laser beam passes through data medium 14 acquiring data modulation in accordance with the opacity or transparency of medium 14. The beam continues upward through data medium 14 striking read lens 92 which is mounted on upper arm 80 directly above spot 90. Read lens 92 focuses the modulated beam into a read pentaprism 94 which refracts the beam horizontally through end bell 42 toward the main portion of carriage 60.

A light sensor 96 receives the modulated laser beam and processes the data samples from medium 14 through an output cable 98 to data storage 30 during the scanning rotations. Light sensor 96 is responsive to sample rate coordinator 26 at control imput 99 to pass data samples at predetermined arcuate intervals of rotating assembly 12. The arcuate interval is the distance between data samples on medium 14 and may be controlled by adjusting the step increment or COMPARE condition in sample rate coordinator 26 as described in copending application Ser. No. 499,273 by Ansis Pommers and Robert Lotz entitled, "Sample Rate Coordinator and Data Handling System" filed herewith and assigned to the present assignee. The sampling interval defines the resolution of the new data base passing into data storage 30 along the circumferential dimension of the old data base or medium 14. The resolution along the axial dimension may be controlled by adjusting the stepping rate of motor 22 which advances carriage 60 along lead screw 20. Allowing more steps between each scanned rotation causes larger axial steps which reduce the resolution of the new data base. The axial step may be reduced by reducing the stepping rate of motor 22, or by changing the linkage ratio in gear box 100 which may be included in the system to connect stepping motor 22 to lead screw 20. Both the axial resolution (stepping rate) and the rotational resolution (sample rate) of the new base may be reduced to increments smaller than the residual vibration of rotary assembly 12.

Figure 3:
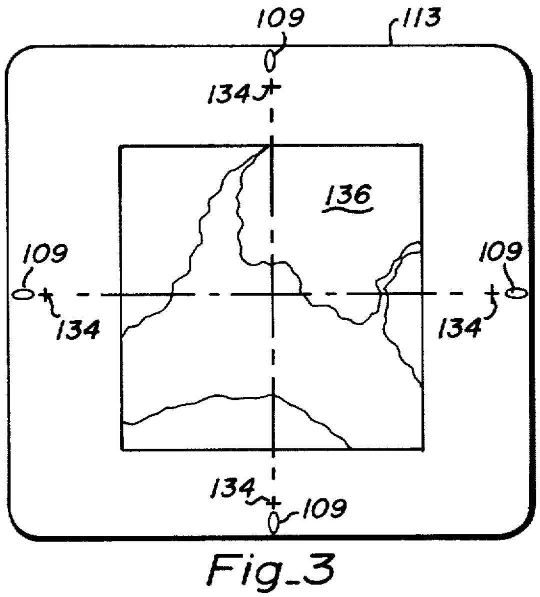
FIG. 3 is a plan view of data film.

In the example of FIGS. 1 and 2, data medium 14 is mounted around the outside of assembly 12 and positioned by registration slots 109 on film 14 and registration pins 110. Preferably, pins 110 are mounted on double eccentrics 111 to permit precise positioning of film 14. Data medium 14 is retained in place by a peripheral vacuum groove 112 which urges the edges of sealing border 113 of medium 14 (See FIG. 3) against the surface of assembly 12. The vacuum is provided to groove 112 through a vacuum port 114 leading through the cylinder wall into the interior of assembly 12. Port 114 connects to a short vacuum hose 116 which communicates with a rotating elbow vacuum connector 118 positioned inside assembly 12 on the end of hollow turning shaft 17. A vacuum line 122 extending through the interior of hollow shaft 17 connects at one end to rotating elbow 118 and at the other end to a vacuum source 120. Additional ports 114 and hoses 116 may be provided in assembly 12 for distributing the vacuum force throughout peripheral groove 112. A vacuum force of 5 to 10 psi is suitable for 35 inch × 35 inch films, and may be varied to accommodate other film sizes and conditions.

Once data medium 14 is in intimate peripheral contact, assembly 12 is checked for alignment. It is preferable that the center line of assembly 12 be coaxial with drive shaft 17 and parallel with lead screw 20. If the coaxial condition is not met, assembly 12 will wobble destroying the correspondence between the X and Y axis of film 14 and the rotational and traverse scanning motion. If the parallel condition is not met, assembly 12 will rotate out-of-round defocussing spot 90 and introducing error in the position spot 90. Both conditions must be met within the resolution requirement of converter 10. The alignment is corrected by providing a suitable assembly positioning device such as drum shoes 126 mounted in end bearings 44 and 48 along the inner surface of end discs 40 and 42. Shoes 126 are radially positioned by turning adjustment screws 128 accessible from the inside of assembly 12 causing assembly 12 to tilt into the coaxial-parallel position. Preferably, three aligning shoes 126 are provided spaced about the periphery of each end disc with additional locking shoes to further secure the position of assembly 12 after alignment. The alignment of assembly 12 may be established and periodically confirmed by observing the size and position of spot 90 from the inside of assembly 12 through a bore sight 130. The spot image is provided at sight 130 by a suitable optical device such as a half silvered mirror 132 mounted between read prism 94 and photo sensor 96.

The alignment of X and Y center line fiducial marks 134 of film 14 (See FIG. 3) can also be monitored through bore sight 130. The longitudinal axis is positioned parallel with lead screw 20 by adjusting double eccentrics 110 which are of equal eccentricity and provide about ±60 miles to accommodate mechanical skew-error between the positions of fiducial marks 134 and slots 109. Further, the double eccentrics can accommodate image skew-error between fiducial marks 134 and the X and Y axis of data area 136 on film 14 (See FIG. 3).

Mechanical details of data converter 10 are further described in copending application Ser. No. 499,339 by Howard Jarmy entitled, "Rotary Data Base Converter with Air Bearing,"filed herewith and assigned to the present assignee.

It is preferable that data medium 14 maintain a round cross section or a cylinder of revolution configuration about the rotation axis of assembly 12. Deviations from the preferred cylindrical configuration cause defocusing and displacement of spot 90.

Figure 4:
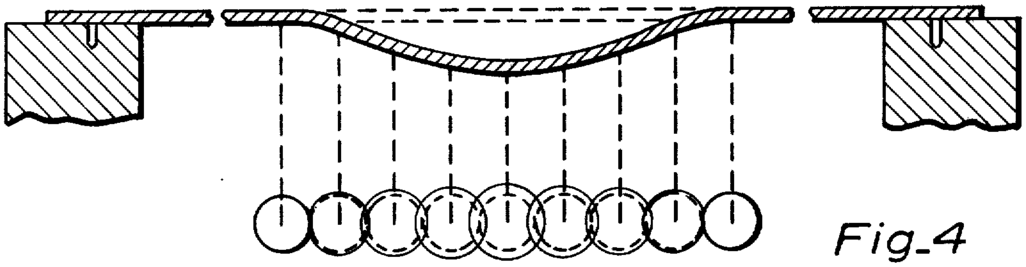
FIG. 4 is a fragmentary sectional view of an installed data film showing the effect of deviation from the cylindrical shape.

FIG. 4 depicts an exaggerated downward deflection (solid line) of data film 14 from the preferred cylindrical configuration (dotted line) to illustrate the change in spot diameter and shape and position of the actual spot 90 (bold lines) as opposed to the intended diameter, shape, and position (light lines). As the surface of film 14 deviates downward the diameter of each sample increases and overlaps due to loss of focus. Also, the location of the sampled spot drifts as the deviation increases due to the stretching of data base 14.

Defocusing is undesirable because the diameter of spot 90 increases (or possibly decreases) causing a variation in the intensity of the modulated light beam at sensor 96. Sensor 96 detects the amount of light that passes through film 14 (minus, of course, that portion of the light which is lost by diffusion, absorbtion, etc.). In effect, sensor 96 measures the average light passing through spot 90. Images on data medium 14 which are smaller than spot 90 cannot resolved. If the diameter of spot 90 is allowed to increase due to deviation of film 14 from the preferred cylindrical shape, the resolution becomes less exact and a light intensity error is introduced into the detected light beam. Displacement of spot 90 due to film deviation is also objectional. Film 14 is sampled at a spot near to, or overlapping, the intended spot, and data storage 30 enters the sampled light intensity at the address of the intended spot. The new data base generated from data film 14 will have small errors due to defocusing and displacement of spot 90 during scanning.

Several factors contribute to the deviation of data base 14 from the preferred cylindrical configuration. The weight of film 14 causes the unsupported center region of film 14 to sag. The thinner the film, the more pronounced is the deviation. However, the gravitational attraction effect can be minimized by rotating assembly 12 about a vertical axis. Thin films 14 are also subject to displacement by slight exterior forces such as air drafts and residual vibrations.

Figure 5:
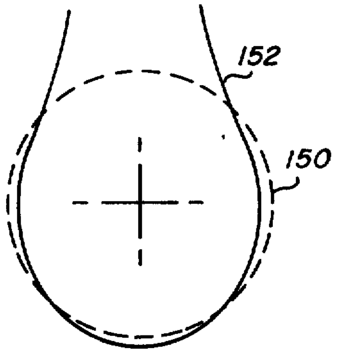
FIG. 5 is a comparison of a circular cross section to the cross section of the unsupported middle portion of the data film wrapped around the end discs.
Figure 6:
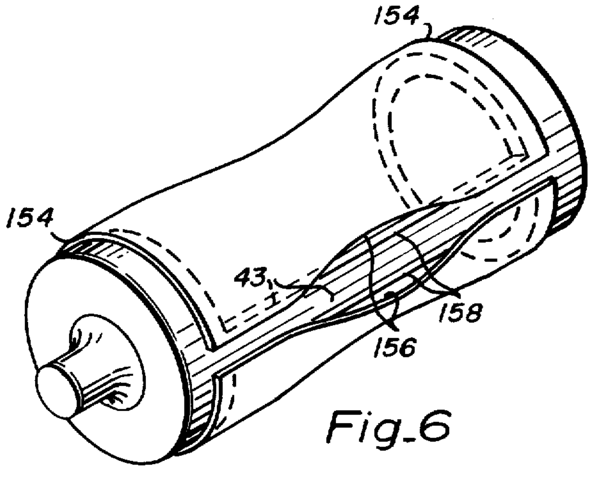
FIG. 6 is an isometric view of a data film wrapped around end discs before the longitudinal edges have been secured, showing the saddle effect deviation.

A primary source of deviation is the "saddle effect" shown in FIGS. 5 and 6 which I observed when attempting to wrap a large film (34 inches by 34 inches) around end discs 40 and 42 (15.5 inches in diameter). I discovered that stiff films oppose assuming a circular cross section 150 (See FIG. 5) along the unsupported middle portion of the film. The film prefers a tear drop shape 152. The end edges 154 of the film can be forced into the round cross section by the shaping effect of end discs 40 and 42 which are round. However, the middle portions of the film are without shaping support and deviate inwardly forming a concave region. The portion of the film near the longitudinal edges 156 deviate outwardly forming convex regions. The resulting double curve configuration resembles a saddle as shown in FIG. 6.

Figure 7:
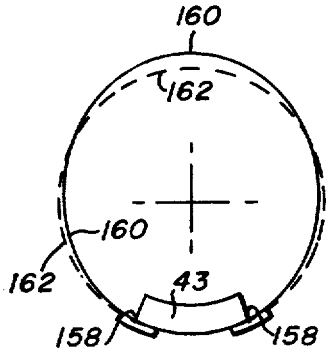
FIG. 7 is a comparison of a circular cross section with the cross section of the film after the longitudinal edges have been secured showing the edge effect deviation.

FIG. 7 shows another primary source of deviation, the 'edge effect' which I discovered when I secured longitudinal edges 156 along spine 43. The "saddle" forces cause the film to bend along longitudinal edges 158 across the center portion of spine 43 forming a slightly out-of-round cross section 160 (solid line) as opposed to a true circle 162 (dashed line) which is maintained proximate the end discs. I estimate that the deviation in a 7 mil thick film 34 inches by 34 inches mounted on a 15.5 inch diameter rotating assembly 12 with an unsupported area 30 inches by 30 inches exceeds ±0.020 mils.

One solution to the deviation problem is to provide a transparent substrate 170 under data film 14 as shown in FIG. 1. The resilience of substrate 170 supplies a radial force which reduces the deviation of data film 14. I found that a 1/32 inch thick sheet of acrylic plastic wrapped around rotating assembly 12 in a cylindrical configuration was sufficient to maintain a 7 mil data film having a data area 30 × 30 inches to within ±0.004 mils of the preferred cylindrical configuration. Thicker substrates may be used to provide greater support for applications having larger data areas and scanning windows. However, substrates of excessive thickness are difficult to bend uniformly about end discs 40 and 42. Thinner substrates may be employed; but excessively thin substrates are subject to the same deviation forces as the 7 mil data film. Substrate 170 may be secured around end discs 40 and 42 and secured along longitudinal edges 158 of spine 43 by any suitable technique such as two sided tape or an additional set of vacuum grooves 112.

After data film 14 has been mounted on substrate 170, visible air pockets may be eliminated by hand squeegeeing them into vacuum groove 112. The presence of air bubbles disturbs the position correspondence between film 14 and the preferred cylindrical surface introducing error into the new data base.

I was surprised to observe that higher resolutions are obtained when the laser beam passes through data medium 14 prior to passing through the thickness of substrate 170. I believe that the beam is optically diffused slightly by the material in substrate 170, and also to some extent by the film thickness of data medium 14. This diffusion causes a certain arbitrariness in the size of spot 90. It is preferred that any lack of definition of spot 90 occur on the digital or read side of medium 14, and that the analog or illumination side have a crisp finely focused spot capable of resolving the detail of film 14. This imaging effect rendered photo sensor 96 surprisingly insensitive to scratches and optical imperfections in substrate 170.

Preferably, one or both surfaces of plastic substrate 170, should have a coating of an antireflectant such as magnesium flouride to reduce secondary reflection. Further, interference patterns may be reduced by employing a fluid optical coupling such as perchlorethylene between substrate 170 and film 14.

Figure 8:
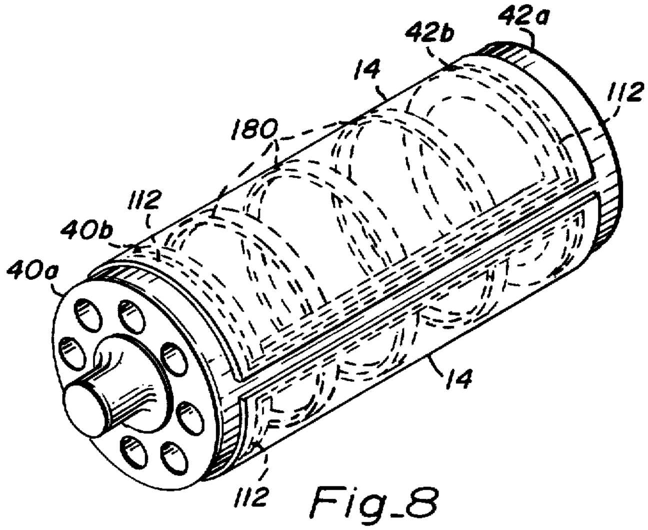
FIGS. 8 and 9 show movable hoops for retaining the data film in a round cross section.
Figure 9:
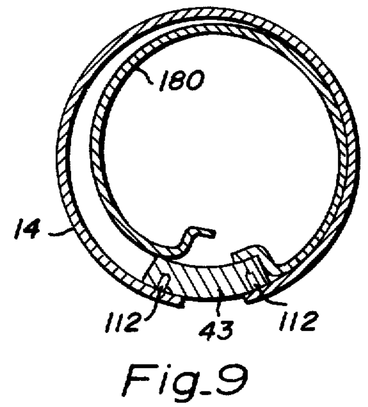

FIG. 8 shows a set of movable circular ribs or hoops 180 mounted inside the cylinder formed by data medium 14 to maintain film 14 in a round cross section during scanning. As scanning assembly 16 approaches each hoop 180, the scanning is temporarily halted so that the hoop may be removed and remounted on the scanned side of scanning assembly 16. Hoops 180 may be easily reached through large bore rear bearing 40 or through access ports provided in front disc 42. Hoops 180 have the same diameter as end discs 40 and 42 and push film 14 outward just enough to overcome the inward forces of the saddle effect. Preferably, hoops 180 may be temporarily contracted to a smaller diameter as shown in FIG. 9 to facilitate repositioning without scratching the inner surface of film 14. After repositioning, hoops 180 are expanded to the full diameter returning film 14 to the cylindrical position.

Figure 10:
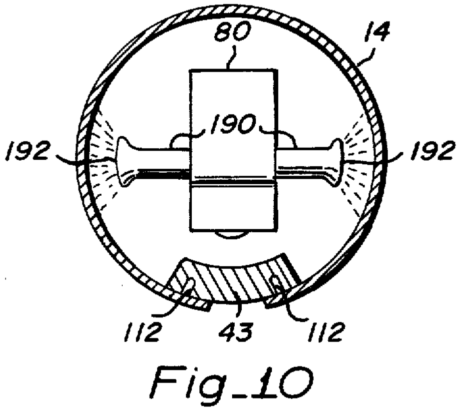
FIG. 10 shows air jets and FIG. 11 shows an air bearing for urging film 14 into a round cross section.

FIG. 10 shows a lateral air jet embodiment for urging film 14 into a round cross section thus reducing the deviation introduced by the saddle effect and gravitational sag. A pair of lateral air nozzles 190 are mounted on inside arm 80 and direct lateral air jets 192 toward the most inwardly deviated area of the concave portions of film 14. The air force opposes the saddle producing forces and film 14 assumes a more round configuration. Further, the residual increase in air pressure inside the film cylinder due to air jets 192 urges the film to a circular cross section, which has a greater volume to surface area than the undesirable saddle shape. Preferably, lateral jets 192 are balanced (of equal magnitude in opposed directions), and inside arm 80 is not laterally deflected by the lateral air forces.

Figure 11:
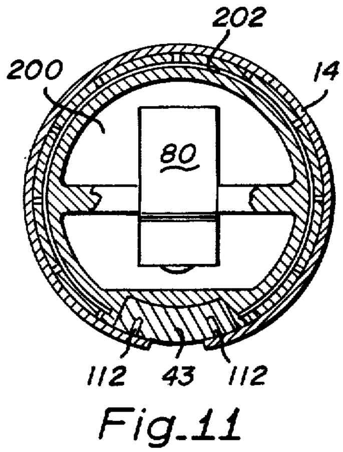

FIG. 11 shows an air bearing embodiment for maintaining a round cross section in film 14. A bearing disc 200 having a diameter of slightly less than end discs 40 and 42 is mounted on inner arm 80. Bearing disc 200 moves through the film cylinder during scanning and provides a radial air pressure 202 which forces the band of adjacent film to temporarily assume a round cross section. Preferably, a bearing 200 is mounted just behind the read head on inner arm 80 as shown in FIG. 2 to minimize the rate of air flow through the modulated light beam. If end disc 40 is solid, the only air flowing past bearing disc 200 is the decreasing volume of air in the cylinder between disc 200 and end disc 40.

Figure 12:
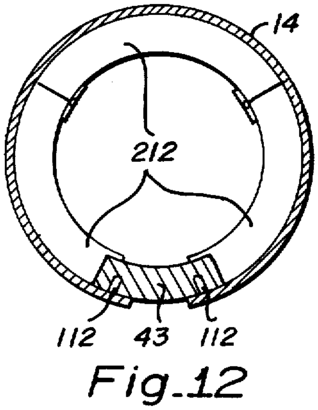
FIGS. 12 and 13 show a removable mounting form for retaining the film in a cylindrical configuration while the edges thereof are secured.
Figure 13:
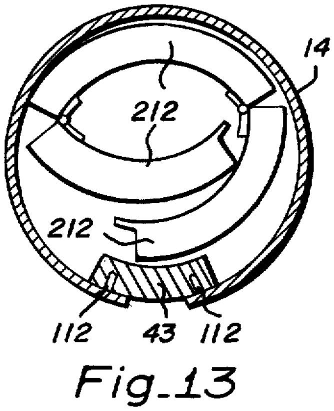

FIG. 12 shows film 14 being mounted on assembly 12 using a cylindrical mounting form which is removed before scanning. Mounting form insures that film 14 is in the preferred cylindrical position when end edges 154 are secured to end discs 40 and 42, and longitudinal edges 156 of ilm 14 are secured to longitudinal edge 158 of spine 43. When the mounting form is removed, the saddle effect and edge effect produce deviation of film 14 from the preferred cylinder. Mounting form may be formed of hinged segments 212 which permit form 210 to collapse as shown in FIG. 13 to facilitate removal. If desired, the mounting form may have a plurality of smaller longitudinal sections which may be repositioned during scanning much as hoops 180 of FIG. 8.

Clearly, various modifications may be made in the above description without varying from the concept of the invention. It is understood that the specific embodiments of the present invention in the foregoing specification is illustrative and not restrictive, and that the breadth and scope of the present invention is indicated by the appended claims.

I claim as my invention:

1. A rotating digitizer system for converting existing data on a flexible transparent medium into a new data base, comprising:

a support assembly having spaced end drums connected by a rigid member and adapted to peripherally retain the transparent medium in a cylindrical configuration across a scanning window formed by the space between the end drums and the rigid member and occupying at least a major arcuate portion of the cylindrically retained transparent substrate;

an internal radial force means adapted to prevent deviation of the transparent medium inwardly from the cylindrical configuration for minimizing saddle effect and edge effect deviations;

a scanning assembly having a light source means and a light sensing means, one of which is positioned within the support assembly;

a rotary drive for establishing relative rotary motion between the assemblies about an axis of rotation concentric with the axis of the cylinder formed by the transparent medium;

a traverse drive for establishing relative traverse motion between the assemblies parallel to the axis of rotation; and drive controller for coordinating the drives to scan at least a portion of the transparent medium displayed in the scanning window.

2. The system of claim 1, wherein the radial force means is a transparent flexible cylindrical substrate abutting the inside surface of the transparent medium for radial reinforcement.

3. The system of claim 2, wherein the substate is a flexible plastic sheet peripherally retained in a cylindrical configuration by the support assembly.

4. The system of claim 1, wherein the radial force means is a positive air pressure from within the cylinder configuration formed by the transparent medium for urging the transparent medium outwardly into a round cross-section.

5. The system of claim 4, wherein the radial force is a radially directed air flow.

6. The system of claim 5, wherein the air flow is radially symmetrical.

7. The system of claim 1, wherein the radial force means is at least one support hoop mounted inside the cylindrical configuration and spanning the scanning window for urging the transparent medium outwardly into a round cross-section.

8. The system of claim 7, wherein at least one support hoop is movable.

9. The system of claim 8, wherein at least one hoop is traversely movable for temporarily retaining the adjacent region of the transparent medium while that region is scanned.

10. A rotating digitizer system for converting an existing data base into a new data base comprising:

a support assembly having a scanning window, the support assembly adapted to retain the existing data base in a cylindrical configuration across the scanning window;

a scanning assembly having a light source means and a light sensing means, one of which is positioned within the support assembly;

a rotary drive for establishing relative rotary motion between the assemblies about an axis of rotation concentric with the axis of the cylinder formed by the existing data base;

a traverse drive for establishing relative traverse motion between the assemblies parallel to the axis of rotation;

drive controller for coordinating the drives to scan the desired area of the existing data base; and an air bearing member adapted to prevent deviation of existing data base inwardly from the cylindrical configuration by providing a traversely moving radial pressure which temporarily urges the proximate portion of the existing data base towards a round cross-section as that portion of the existing data base is scanned.

* * * * *